Figure 1:
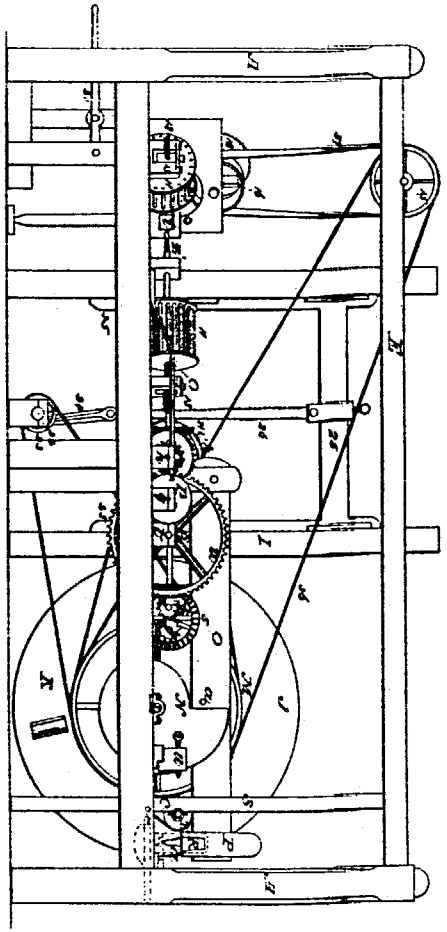
Figure 2:
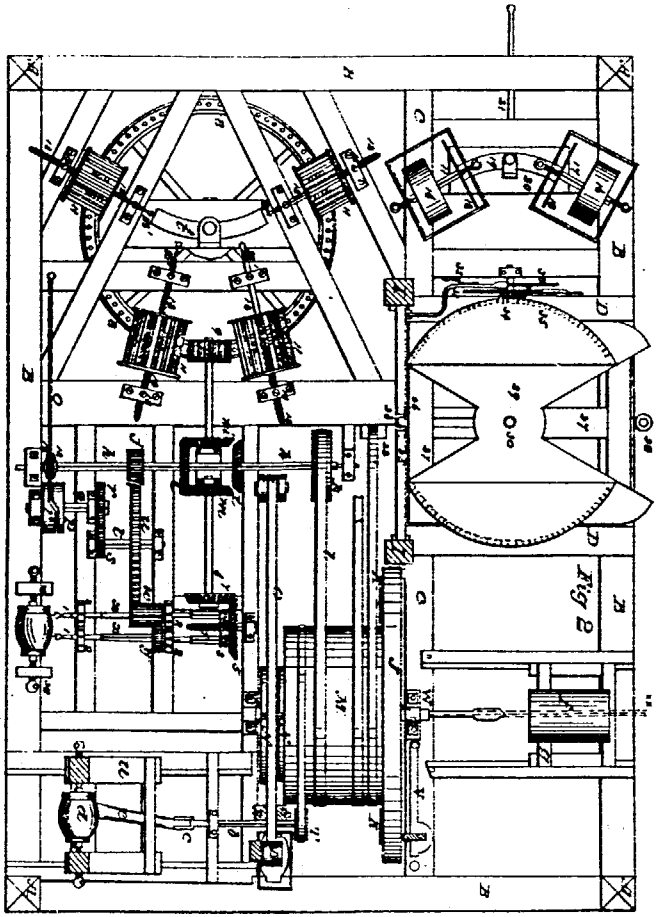
Figure 3:
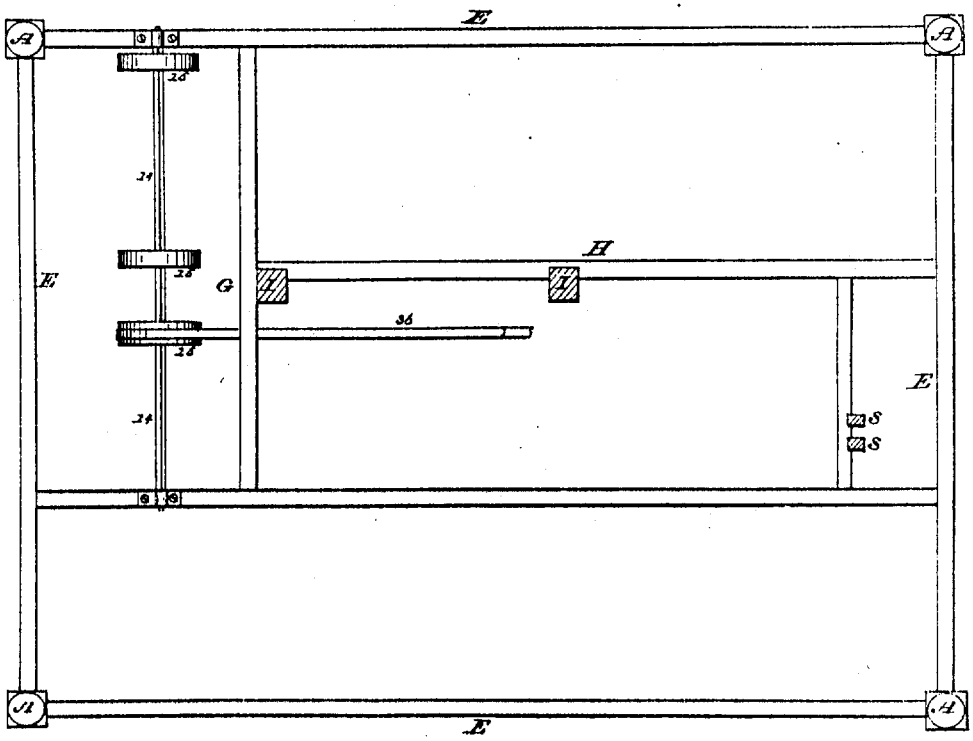

2 Sheets-Sheet 1.

1257X

M. Battle,

Wheelwrights' Machine.

Patented Apr. 4, 1810.

AM. PHOTO-LITHO. CO. N.Y. (OSBORNE'S PROCESS.)

2 Sheets-Sheet 2.

1257X

M. Battle,

Wheelwrights' Machine.

Patented Apr. 4, 1810.

AM. PHOTO-LITHO. CO. N.Y. (OSBORNE'S PROCESS.)

486 12577X [illegible]

Mellen Battle April 4, 1810

Letters Patent (Patented April 4. 1810)

The schedule referred to in these Letters patent and making part of the same, containing a description in the words of the said Mellen Battle himself of his American wheel rights Labor saving Machine

---

The frame of the Machine should be fourteen feet six inches long, Eleven feet wide and seven feet high, the frame will consist of four corner posts, seven inches square, four girts seven inches square, to lie horizontally in the frame, two feet six inches from the floor. One cross girt seven by six inches square, to lie lengthwise in the frame, [illegible] feet from one side, and two feet six inches from the floor, two girts seven by six inches square to lie four feet six inches apart, and four feet six inches from one end two feet six inches from the floor. Four plates five by three inches square framed into the head of the four corner posts seven feet from the floor, one girt five by three inches square, lieing lengthwise in the frame seven feet from the floor, three feet six inches from one side, one Counter girt seven feet long five by three inches square and four feet from one end into which a girt is framed five by three inches square and ten feet long lieing lengthwise in the frame, on which hang two fender posts six inches square which reach the floor; the Machinery will consist of one main upright wheel five feet in Diameter four inches thick, in the rim of which will be placed three [illegible] Irons four inches from the circumference the said Irons are to be placed in the same manner as they are in a common plane and which hangs upon a shaft of Iron one inch and a half square, three feet six inches long, near the middle ^and one end of the frame and on said shaft^ Connected with the wheel a Cylinder of one foot nine inches long and three feet in diameter; likewise on said shaft connected with said Cylinder a double scroll to raise nine inches, on said scroll plays an Iron pin through a wooden shaft nine by three inches square seven feet long; on the end of said shaft and two feet six inches from the Iron pin, will be fixed an Iron head in the form of a hammer in the face and under side of which, will be a socket to receive a double Burr two inches wide [illegible] one [illegible] thick, and in the side of said Iron head,
will be a Gain to receive the Cutter three inches wide, said shaft
will play up and down between two fender posts, said Iron head
will play by the side of an upright piece with a groove in the side
to receive a spoke, in such a manner that the Cutter in the Iron
head will Tenont said spokes there will be parallel with the shaft
of the main [illegible] wheel a Cylinder of Wood through which passes an
Iron spindle in the end of which is a saw bit for the purpose
of Tenonting the other end of the spoke and Bridging the Hub,
also a carriage to direct the Hub and spoke to the saw bitt the
said Bit is turned by a strap passing over its Cylinder on to the
main Cylinder, by the side of the face of the main wheel
stands a [illegible] carriage, with a groove suitable to receive spokes
being in such manner that when the spoke is in the Groove it
will carry it to the face of the main wheel, in such a manner
that the jointed Irons in said wheel will dress it, likewise a
socket in the end of the main shaft to receive an auger for boring
the centre of the Hub, also a carriage that will carry the hub
to the Auger, and from said Carriage to the end of the main
shaft will run an Iron spindle for the purpose of turning
the rim of a wheel, there will be and Iron spindle parallel
with the main shaft four feet six inches long one inch and
half square, and on said spindle will be a wooden Cylinder
to receive a strap which leads to the main Cylinder, likewise
on said Spindle will be two bevel wheels and one pinion,
said wheels will stand with their bevels facing each other
and at such distance as to receive between them two re-
versing bevel wheels, said wheels are to be of cast Iron, on the
end of said spindle stands two Collars, between which works
an Iron hand one end of which is made fast the other
end of said [illegible] hand plays in a Transverse grooving in the
rim of a wooden Wheel, said wooden wheel hangs upon a spindle parallel with the aforesaid spindle, being one foot six inches
long and one inch square, and on the end of said spindle hangs
an Iron Wheel which is turned by a pinion upon the end
of a spindle which passes through a large Iron upright con-
necting wheel which wheel is turned by a pinion on the spindle
containing the two bevel wheels, the motion of said Wheels will
be six times to the regulating wheel once, said Connecting wheel
works into a pinion of six inches long and four inches Diameter,
through said Spindle lays Horizontal a Spindle, in the end of
which is a bitt, said pinion turns a pinion of four inches Diameter and
one inch thick, through which runs another Horizontal Spindle in
the end of which is a bitt, said Spindles will lie in such a manner
as to bore the [illegible] for Mortise in a Hub, on each end of said spindle,
there will be a Coll[illegible] of six inches long and said Collars work four Iron
Plummer blocks, on each end of said Blocks are screws and nuts, and
on the end of said spindles on the opposite end of the bitts is an Iron plate
with each end forked, through the Centre of the plate is a [illegible] on a
spindle leading through a bevil wheel which turns a Counter Spindle
with two bevil Wheels one of which plays in the reversing wheels, on
horizontal face wheel four feet six inches in diameter, said wheels
to be of wood or Iron the top of said wheel to be two feet six inches from
the floor; and the Said Wheel is turned by an upright wheel of Iron,
which hangs upon an Iron spindle, and on the end of said Spin-
dle, hangs an Iron bevil wheel which is turned by the reversing
bevel wheels, said face wheel turns four Iron upright wheels hung
upon four Iron spindles laying in such a manner, that with
bits in the end of said Spindle they will bore a Fellow, in the opposite
end of the spindles containing the four bitts is a screw working
in the Coll[illegible], all the Collars contain screws and nuts so that
they are moveable, all of said Spindles containing bitts are
driven to any given distance by means of the screws and
Collars on the end of the spindles and return by the reversing

1257X and regulating wheels, also two Plummer blocks that hold the Mill when its bored, there is one Shaft of seven feet hanging upon the top of the frame, on which is three Cylinders, upon one Cylinder is a strap leading to the Cylinder of the main wheel, and from the other two Cylinders runs two bands to two wheirs, said Wheirs hung upon two Iron Spindles on the spindles is a Collar to project out half an inch; between the Collars hungs two Buzz saws laying in such manner as to saw off both ends of a Fellow at any given length with their proper bevil. Said Fellow raises to the saws by means of a Block on which it is fastened which moves by means of a lever, a strap from the main Cylinder leading over another Cylinder on which is an Iron crank affixed to which is a Pitman leading to the sawgate which hungs upon the aforesaid fender Posts, in said gate hangs two saws said saws contain Teeth on both sides standing towards the Fender Posts, on the side of the saw gate is a square carriage which moves up the saws between the sawgate by means of a screw to any assigned distance, and on said Carriage is a reversing carriage, which turns upon a Centre in the middle of the square carriage the reversing carriage is moved backwards and forwards by means of a hand and dog and two Rag wheels with teeth both ways, on the Shaft leading through the Rag wheels is a pinion working a Rack on the reversing carriage.

Witnesses. Mellen Battle

John Bernard

Pharis Bernard

Exd. [illegible]

(1518 words) (Patented April 4. 1810.)

Drawing Made

[illegible]